(12) United States Patent
Johnsen et al.

(10) Patent No.: US 6,890,679 B2
(45) Date of Patent: May 10, 2005

(54) DUAL-POROSITY RIBBED FUEL CELL CATHODE

(75) Inventors: Richard Johnsen, New Fairfield, CT (US); Chao-Yi Yuh, New Milford, CT (US); Michael Alexander, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 81 days.

(21) Appl. No.: 10/226,450

(22) Filed: Aug. 23, 2002

(65) Prior Publication Data

US 2004/0038115 A1 Feb. 26, 2004

(51) Int. Cl.$^7$ ............................ H01M 4/86; H01M 4/98
(52) U.S. Cl. .............................. 429/40; 429/44; 429/38
(58) Field of Search .............................. 429/34, 38, 40, 429/44, 46, 16

(56) References Cited

U.S. PATENT DOCUMENTS

| | | | | |
|---|---|---|---|---|
| 4,115,627 A | * | 9/1978 | Christner et al. | ............. 429/44 |
| 4,374,906 A | * | 2/1983 | Breault et al. | ................ 429/44 |
| 4,547,418 A | * | 10/1985 | Shigeta et al. | .............. 428/167 |
| 4,654,195 A | | 3/1987 | Wnuck et al. | |
| 5,071,717 A | * | 12/1991 | Bushnell | ...................... 429/13 |
| 5,531,956 A | | 7/1996 | Ong et al. | |

FOREIGN PATENT DOCUMENTS

| | | | | | |
|---|---|---|---|---|---|
| JP | 63116369 A | * | 5/1988 | ............ H01M/8/02 |
| JP | 06176764 A | * | 6/1994 | ............ H01M/4/86 |

* cited by examiner

*Primary Examiner*—Patrick Ryan
*Assistant Examiner*—Tracy Dove
(74) *Attorney, Agent, or Firm*—Robin, Blecker & Daley

(57) ABSTRACT

A fuel cell cathode comprising a cathode body having rib regions and base regions which connect the rib regions, the rib regions being of greater thickness and of less porosity than the base regions.

13 Claims, 2 Drawing Sheets

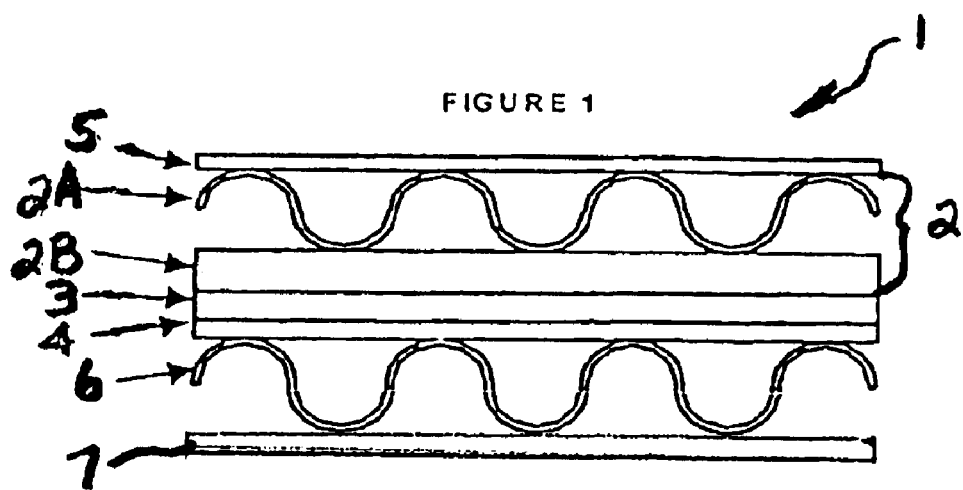
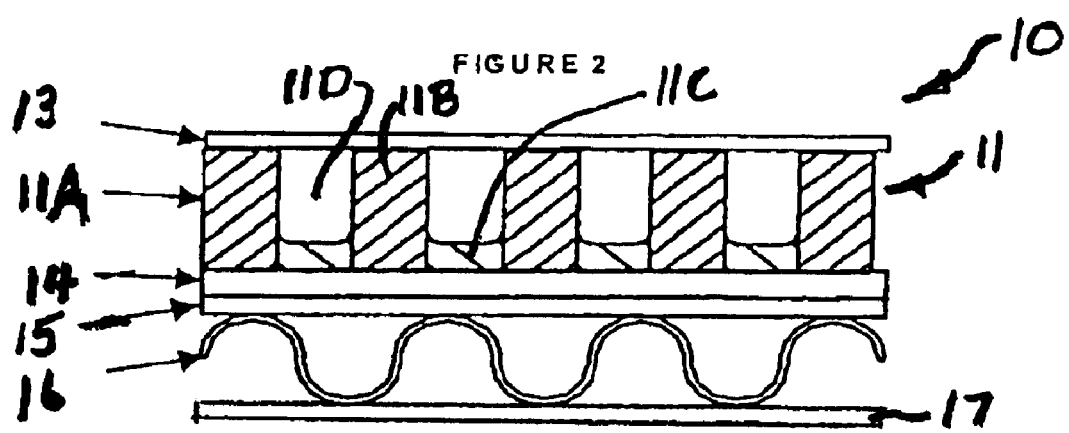
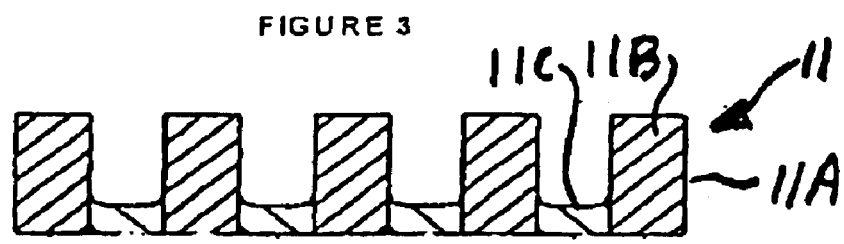

Figure 4. SUMMARY OF RIBBED CATHODE CREEP TESTS:
The Powder Type and the Rib Density Affect Creep.

| Cathode Type | Nickel Powder Type | Porosity of Loading-Bearing Area (%) | Approx. Ratio of Rib to Groove Width | Cathode Thickness Pre-test (x 0.001") | Creep (x 0.001") | Creep (%) |
|---|---|---|---|---|---|---|
| Baseline Planar | Ni 255 | 78 | None | 35 | 4 | 11 |
| Baseline Planar | Ni 255 | 75 | None | 35 | 1 | 3 |
| Ribbed | Ni 255 | 72 | 1:1 | 104 | 9 | 9 |
| Ribbed | Ni287 | 72 | 1:1 | 95 | 4 | 4 |

Standard Test Conditions = 1000h @ 670%, 35 psi load, simulated cathode gas = 17% $CO_2$, 11% $O_2$, 12% $H_2O$, 60% $N_2$

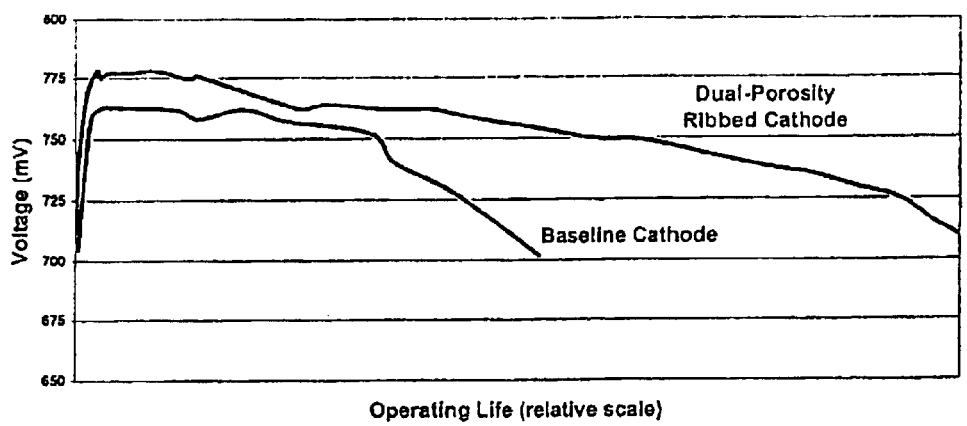

Figure 5

DUAL-POROSITY RIBBED FUEL CELL CATHODE

STATEMENT REGARDING FEDERALLY SPONSORED RESEARCH OR DEVELOPMENT

This invention was made with Government support under Contract No. DE- FG02-95ER81966 awarded by the U.S. Department of Energy. The Government has certain rights in this invention.

BACKGROUND OF THE INVENTION

This invention relates to a cathode for carbonate fuel cells and, in particular, to a ribbed cathode for such cells.

Carbonate fuel cells produce energy in a clean and efficient way by directly converting chemical energy stored in hydrocarbon fuel into electrical energy by means of an electrochemical reaction. Generally, a fuel cell unit comprises an anode and a cathode separated by an electrolyte, which serves to conduct electrically charged ions. In carbonate fuel cells, reactant fuel gas is passed through the anode, while oxidizing gas is passed through the cathode. In order to produce a useful power level, a number of individual fuel cell units are stacked in series with an electrically conductive separator plate between each cell.

A conventional carbonate fuel cell cathode assembly incorporates a stainless steel cathode current collector that forms oxidant gas channels and conducts electricity from the cathode to a bipolar plate. The cathode of the assembly, in turn, is flat or planar, and is generally prepared by dry doctoring and sintering filamentary nickel powder. The cathode is also typically filled with electrolyte before assembling it into the fuel cell.

The conventional cathode assembly results in a large amount of electrolyte loss from the fuel cell. It has been experimentally determined that approximately 25% of the lithium carbonate in the electrolyte is depleted after 40,000 hours of operation due to corrosion of the current collector of the assembly. In particular, the current collector is responsible for approximately 70% of the total electrolyte loss.

Because fuel cells operate under a constant compressive load, another difficulty experienced with the conventional fuel cell cathode assembly is creep of the cathode. Cathode creep is the susceptibility of the cathode to shrink and become compact under the constant compressive forces in the fuel cell. Cathode creep is inversely proportional to the cathode porosity, where the susceptibility of the cathode to shrink and become compact increases with higher porosity. At the same time, the electrochemical performance and electrolyte storage capacity of the cathode are directly proportional to the cathode porosity. Therefore, the cathode porosity is determined by a compromise between minimizing shrinkage and maximizing performance and electrolyte storage capacity.

Another type of cathode assembly utilizes a ribbed cathode instead of the flat or planar cathode. The ribbed cathode itself provides the required gas flow channels and thus the cathode assembly does not require a current collector to deliver the gas to the cathode. In a carbonate fuel cell system, a ribbed cathode may provide some advantages over the baseline or conventional flat cathode-current collector cathode assembly, including increased cell inventory of the electrolyte, reduction in the loss of the electrolyte due to corrosion of the current collector and the removal of the costs associated with fabricating the cathode current collector. In spite of these advantages, the increased thickness of the ribbed cathode makes it more susceptible to cathode creep.

Several patents disclose methods of fabricating ribbed electrodes, including anodes and cathodes. For example, U.S. Pat. No. 4,654,195 describes a method for fabricating a ribbed anode with strengthening additives in which the electrode is formed and pre-fired in a mold. The formed electrode is then removed from the mold and sintered in a reducing atmosphere. The electrode may then be optionally compacted to achieve a desired final thickness. U.S. Pat. No. 5,531,956 describes another method of producing a ribbed electrode that includes the steps of depositing a suspension of a powdered electrode metal onto the face of a substantially flat porous electrode metal substrate, forming raised structures on the face of the electrode, and then sintering the electrode.

As above-mentioned, the ribbed cathodes formed by these procedures still exhibit significant creep in the absence of strengthening additives.

It is therefore an object of the present invention to provide a ribbed cathode possessing excellent strength and electrochemical performance characteristics, while minimizing cathode creep.

It is a further object of the present invention to provide a ribbed cathode adapted to provide an increase fuel cell life, particularly for carbonate fuel cells, by reducing electrolyte loss during operation and increasing electrolyte storage capacity.

It is also an object of the present invention to provide a ribbed cathode adapted to permit an increase in the lithium concentration of the fuel cell electrolyte, thereby reducing electrolyte evaporation and cathode dissolution rates.

SUMMARY OF THE INVENTION

In accordance with the principles of the present invention, the above and other objectives are realized in a fuel cell cathode comprising a cathode body having rib regions and base regions which connect the rib regions, the rib regions being of greater thickness and of less porosity than the base regions. With this type of construction, the lower porosity of the rib regions permits these regions to be more compacted so as to provide the needed strength for the cathode to withstand compressive forces and avoid creep. The higher porosity of the base regions, in turn, enhances fuel cell performance.

In a further aspect of the invention, an electrolyte component is stored in the base regions of the cathode body to provide a supply of such component when the cathode is used in a fuel cell.

BRIEF DESCRIPTION OF THE DRAWINGS

The above and other features and aspects of the present invention will become more apparent upon reading the following detailed description in conjunction with the accompanying drawings in which:

FIG. 1 shows a cross-sectional view of a carbonate fuel cell unit employing a conventional fuel cell cathode assembly;

FIG. 2 shows a cross-sectional view of a carbonate fuel cell, incorporating a fuel cell cathode assembly in accordance with the principles of the present invention;

FIG. 3 shows a detailed, cross-sectional view of the fuel cell cathode assembly of FIG. 2;

FIG. 4 shows a table of the summary of creep test results for conventional fuel cell cathode assemblies and for the fuel cell cathode assemblies of the invention;

FIG. 5 shows performance data for a fuel cell utilizing a conventional fuel cell cathode assembly and the fuel cell cathode assembly of the invention.

DETAILED DESCRIPTION

FIG. 1 shows a cross-sectional view of a fuel cell unit 1 employed in a conventional carbonate fuel cell. The fuel cell unit utilizes a conventional fuel cell cathode assembly 2 having a stainless steel cathode current collector 2A and a cathode 2B. An electrolyte matrix 3 abuts the cathode 2B and is followed by an anode 4. The cathode current collector 2A is situated between the cathode 2B and a bipolar plate 5 and forms channels through which the oxidant gas flows. The cathode current collector 2A also conducts electricity from the cathode 2B to the bipolar plate 5. An anode current collector 6 is situated between the anode 4 and a further bipolar 7 plate. This current collector forms fuel gas channels and acts as a conductor between the anode 4 and the bipolar plate.

FIG. 2 shows a cross-sectional view of a fuel cell unit 10, having a fuel cell cathode assembly 11 in accordance with the principles of the present invention. The cathode assembly 11 comprises a cathode body 11A having rib regions 11B and base regions 11C, with the rib regions 11B being connected by and being of greater thickness than the base regions 11C.

As shown, the rib regions 11B are configured as rectangular, elongated parallel members, with a base region 11C interposed between successive rib regions. The rib and base regions thus define parallel channels 11D in the cathode body 11A.

The cathode assembly 11 is situated between a bipolar plate 13 and an electrolyte matrix 14, with the upper ends of the rib regions being in contact with the bipolar plate 13 and the lower ends of the rib regions and the base regions being in contact with the matrix. The matrix 14 is followed by an anode 15, which is followed by an anode current collector 16 and an abutting bipolar plate 17.

In accordance with the principles of the invention, the cathode assembly 11 is further adapted so that the porosity (i.e., as used herein the term "porosity" means the percent ratio of the void volume to the total volume) of the rib regions 11B is less than the porosity of the base regions 11C. This selection of the porosity of the rib and base regions maintains creep within desired requirements, while it also reduces electrolyte loss and increases the electrolyte storage capacity. It additionally tends to maximize cell output voltage. The overall strength and performance of the fuel cell unit 10 is thereby significantly enhanced.

FIG. 3 shows the cathode assembly 11 without the other components of the fuel cell unit 10. The rib regions 11B of the cathode body 11 are the load-bearing regions of the cathode 11. These regions are subjected to a constant compressive load due to the clamping forces on the fuel cell unit when arranged in a fuel cell stack. As a result, the rib regions 11B are prone to compaction and are made denser (i.e., less porous), as previously indicated, than the base regions 11C in order to provide ample strength to withstand the constant compression force, and thereby minimize creep.

In contrast, the base regions 11C of the cathode body 11 are not subject to a constant compression load and, therefore, are configured to be more porous than the rib regions 11B. The base regions thus have a larger average pore size than the rib regions 11B. This larger pore size results in a lower electrolyte fill level, which enhances the oxidant gas diffusion into the cathode and decreases cathode polarization. Moreover, cell voltage decreases with lower cathode porosity. Therefore, the larger pore size and, accordingly, larger porosity, of the base region tends to maximize fuel cell voltage performance.

The particular physical parameters selected for the rib regions and the base regions of the cathode body 11A depends upon various factors including the aforementioned performance and strength considerations. More particularly, the porosity in the rib regions and the cathode regions can vary, while being selected to satisfy the requirement that the rib regions 11B be of less porosity than the base regions. For a cathode body formed from INCO 287 nickel powder, a rib region porosity of between 66–73% is desirable, and a base region porosity of between 74–79% is likewise desirable.

The widths of the rib regions 11B and the base regions 11C can also vary. The optimum width of these regions is determined by considering the minimization of the gas flow pressure drop through the channels 11D formed by the rib and base regions (this favors wider base regions), and the minimization of the gas diffusion path length into the cathode (this favors narrower rib regions). In practice, for a cathode body formed from INCO 287 nickel powder, a rib region width and a base region width equal to 0.050 inches has been shown to provide improved fuel cell performance and acceptable pressure drop losses. A usable range for the rib region width and the base region width is >0.030 inches and <0.120 inches.

In addition, the thickness of the rib and base regions may also vary widely. A usable thickness for the base regions 11C of a cathode body formed from INCO 287 nickel powder is greater than 0.019 inches to provide sufficient handling strength but less than 0.040 inches to minimize cathode polarization losses. A usable range of thickness for the rib regions 11B might be greater than 0.050 inches and less than 0.150 inches, considering the pressure drop losses and cathode creep.

Moreover, the pattern of the rib regions 11B can be different from the continuous rectangular configuration shown. Thus, the pattern may be varied in order to provide optimal gas flow distribution. One variation is to provide slots or openings in the rib regions 11B along their lengths to increase the gas communication between the channels 11D. Another variation would be to arrange the rib regions 11B in a staggered pattern.

FIG. 4 provides a table illustrating a summary of creep tests in baseline or conventional planar cathodes and in the ribbed cathodes of the invention. The cathode creep tests performed on planar cathodes made from INCO 255 nickel powder show that the amount of cathode creep increases with increasing porosity. The cathode creep tests performed on ribbed cathodes of the invention, in turn, show that the ribbed cathodes made from INCO 287 nickel powder have approximately twice the creep strength as the ribbed cathodes made from INCO 255 nickel powder.

More particularly, as can be seen in FIG. 4, a ribbed cathode made from INCO 255 nickel powder was susceptible to 9% cathode shrinkage under a constant compressive load of 35 psi, while a ribbed cathode made from INCO 287 nickel powder was susceptible to 4% shrinkage under similar conditions. This difference in shrinkage of the ribbed cathodes of the invention made with the different nickel powders may be due to the less fibrous nature of the INCO 287 nickel powder, which enhances sintering. Moreover, based on these tests, it was determined, as previously mentioned, that in order to provide sufficient creep strength for the INCO 287 nickel ribbed cathode, the rib-area porosity should be desirably less than 73%.

FIG. 5 shows single cell performance data for a fuel cell using the ribbed cathode of the invention (curve labeled "Dual Porosity Ribbed Cathode") and for a fuel cell using the conventional or baseline planar cathode (curve labeled "Baseline Cathode"). The x-axis corresponds to the fuel cell operating life. The y-axis corresponds to the voltage of the fuel cell. Higher voltage produced by a fuel cell improves the performance of the fuel cell.

As can be seen in FIG. 5, the fuel cell incorporating the ribbed cathode of the invention achieves higher voltages and has a longer operating life than a fuel cell incorporating the conventional or baseline cathode. As a result the overall performance of the fuel cell is improved.

In a further aspect of the invention, the ribbed cathode of FIGS. 2 and 3 of the invention is further adapted to store an electrolyte component. This permits the cathode when used in a fuel cell to reduce electrolyte evaporation and dissolution rates in the cathode. In the present illustrative case, the electrolyte component is lithium.

More particularly, increased lithium concentration may be accomplished by storing lithium carbonate ($Li_2CO_3$) in the channels 11D of the cathode body 11. The stored lithium carbonate in the channels 11D then melts into the cathode during cell operation.

Although the average operating temperature of a carbonate fuel cell (approximately 630° C.) is below the melting point of lithium carbonate (720° C.), the liquid eutectic electrolyte normally stored in the body of the cathode acts to dissolve the lithium carbonate in the rib channels 11D during fuel cell operation. Generally, the composition of the liquid eutectic electrolyte is 62 mole percent of lithium carbonate ($Li_2CO_3$) and 38 mole percent of potassium carbonate ($K_2CO_3$). However, by pre-filling the rib channels 11D with lithium carbonate, the initial fuel cell electrolyte composition may be changed so as to increase lithium concentration in the cathode. For example, if 20% of the volume of the rib channels 11D volume is pre-filled with lithium carbonate, the initial electrolyte composition of 62 mole percent of lithium carbonate and 38 mole percent of potassium carbonate may be changed to a composition of 70 mole percent of lithium carbonate and 30 mole percent of potassium carbonate.

Several methods are available for storing lithium carbonate in the rib channels 11D of the ribbed cathode. One method involves a modification of a conventional cathode electrolyte filling procedure. During the conventional cathode electrolyte filling procedure, the eutectic carbonate electrolyte is melted into the cathode. In the modified cathode electrolyte filling procedure, lithium carbonate powder is spread into the rib channels after which the eutectic carbonate powder is spread into and on top of the upper ends (those abutting the bipolar plate 13) of the rib regions 11B. The cathode is then passed through a tunnel furnace in a reducing atmosphere at the temperature of approximately 630° C. in order to melt the eutectic electrolyte into the cathode. After the eutectic electrolyte melts into the cathode, a layer of lithium carbonate that is left behind becomes bonded to the cathode inside the rib channels 11D. In this procedure, the temperature of the tunnel furnace should not be raised to reach the melting point of lithium carbonate (720° C.), because the melting of lithium carbonate into the cathode would result in unwanted sintering, shrinkage and surface area reduction of the cathode.

Another method of storing the lithium carbonate in the rib channels 11D involves making a slurry from a lithium carbonate powder, binder and solvent, and then casting the slurry into the rib channels 11D after pre-filling the cathode rib regions with eutectic electrolyte. The slurry is applied after the cathode is run through the furnace for the pre-filling of the rib regions. Binder such as B-67 Acryloid manufactured by Rohm and Haas may be used in making the slurry. The solvent used in the slurry may be isopropanol.

Once the ribbed cathode of the invention has been adapted to store lithium carbonate in the channels 11D using one of the above methods, when the ribbed cathode is used in a fuel cell, the lithium carbonate stored in the rib channels will melt into the cathode as the temperature of the fuel cell during its operation reaches approximately 630° C. This provides added lithium carbonate for the cathode and results in the advantages discussed above.

The following is an example of the fabrication of a ribbed cathode of the invention and the performance of a fuel cell employing the cathode.

EXAMPLE

A cathode in accordance with the principles of the present invention was fabricated by dry doctoring INCO 287 nickel filamentaxy powder onto a graphite substrate and sintering the powder bed at approximately 810° C. for approximately 10 minutes in a tunnel furnace in a reducing atmosphere. After sintering, the planar cathode was pinch-rolled to a porosity of 75% and a thickness of 105 mil. Channels were then machined into the flat, sintered sheet to form ribs. In practice, the ribs may be formed in a mold to attain faster production speeds. Cross-slits or cutouts were then machined perpendicular to the rib direction every ¾ inch to allow for gas communication between the channels. The rib and channel widths were each approximately 50 mil.

After the ribs were machined, the cathode was pinch-rolled to consolidate the height and reduce the rib area porosity from 75% to 72%, while leaving the material between the ribs at 75% porosity. The cathode was then filled with electrolyte and creep tested to determine the creep strength. The creep test conditions were 670° C., 35 psi compressive force, with a gas composition of 17% $CO_2$, 11% $O_2$, 61% $N_2$ and 11% $H_2O$ for a duration of 1000 hours. The creep tests result are given in FIG. 4 which has been discussed above.

It was determined from these tests that a ribbed cathode made with INCO 287 nickel powder and with a rib porosity of 72% and a thickness of 0.095 inches has sufficient creep strength, on par with the baseline or standard cathode (78% porosity, 0.035 inches thickness) creep, as both crept 0.004 inches. Allowable creep is creep up to 0.010 inches. A further reduction in creep may be achieved by a further reduction in rib porosity.

FIG. 4 also provides the creep test results for a ribbed cathode made from INCO 255 nickel powder instead of INCO 287 nickel powder. This cathode was fabricated having the same porosity distribution as the cathode made with the INCO 287 nickel powder. As the figure shows, the INCO 255 nickel powder cathode had less creep strength (0.009 inches of shrinkage) than the INCO 287 nickel powder cathode.

The cell performance of the INCO 287 nickel cathode fabricated in the above example was determined in a single fuel cell, bench-scale test. The results are illustrated in FIG. 5, which was also discussed above. As was mentioned, the cell performance and stability of the cell having the cathode of the invention was shown to be significantly better than the cell utilizing the baseline or conventional cathode. The pressure drop of the cathode gas through the ribbed cathode was measured to be approximately twice that of the conventional cathode assembly using a planar cathode and standard corrugated current collector, which is within operating limits.

In all cases it is understood that the above-described arrangements and methods are merely illustrative of the many possible specific embodiments which represent applications of the present invention. Numerous and varied other arrangements can be readily devised in accordance with the principles of the present invention without departing from the spirit and the scope of the invention.

What is claimed is:

1. A cathode for use in a fuel cell comprising:
a cathode body having rib regions and base regions which connect the rib regions, the rib regions being of greater thickness and of less porosity than the base regions, the porosity of the rib regions being in a range of 66–73% and the porosity of the base regions being in a range of 74–79%, and said cathode body comprising a nickel material.

2. A cathode in accordance with claim 1, wherein:
said nickel material is formed from a filamentary nickel powder.

3. A cathode in accordance with claim 2, wherein:
the thickness of said base regions is in the range >0.019 inches and >0.040 inches and the thickness of said rib regions is in the range >0.050 inches and <0.150 inches.

4. A cathode in accordance with claim 3, wherein:
the width of said rib regions and the width of said base regions is in a range >0.030 inches and <0.120 inches.

5. A cathode in accordance with claim 1, wherein successive rib regions are spaced apart by a base region to define channels for said cathode body.

6. A cathode in accordance with claim 5, wherein:
an electrolyte component is stored in said channels.

7. A cathode in accordance with claim 6, wherein:
said electrolyte component includes a lithium salt.

8. A cathode in accordance with claim 7, wherein:
said lithium salt is lithium carbonate.

9. A fuel cell comprising:
an anode;
a cathode, said cathode comprising a cathode body having rib regions and base regions which connect the rib regions, the rib regions being of greater thickness and of less porosity than the base regions, the porosity of the rib regions being in a range of 66–73% and the porosity of the base regions being in a range of 74–79%, and said cathode body comprising a nickel material; and
an electrolyte member situated between said cathode and said anode such that the electrolyte member abuts the base regions and the lower ends of the rib regions of said cathode body.

10. A fuel cell in accordance with claim 9, wherein:
said nickel material is formed from a filamentary nickel powder;
the thickness of said base regions is in the range >0.019 inches and <0.040 inches and the thickness of said rib regions is in the range >0.050 inches and <0.150 inches; and
the width of said rib regions and the width of said base regions is in a range >0.030 inches and <0.120 inches.

11. A fuel cell in accordance with claim 9, wherein:
successive rib regions are spaced apart by a base region to define channels for said cathode body; and
an electrolyte component is stored in said channels.

12. A fuel cell in accordance with claim 11, wherein:
said electrolyte component includes a lithium carbonate.

13. A fuel cell in accordance with claim 9, further comprising:
a bipolar plate abutting the upper ends of the rib regions of said cathode body.

* * * * *